(12) United States Patent
Bumpus et al.

(10) Patent No.: US 7,861,168 B2
(45) Date of Patent: Dec. 28, 2010

(54) REMOVABLE HARD DISK WITH DISPLAY INFORMATION

(75) Inventors: Winston Bumpus, Austin, TX (US); Ajay Agarwal, Austin, TX (US); William A. Curtis, Austin, TX (US); Thomas L. Pratt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 483 days.

(21) Appl. No.: 11/625,441

(22) Filed: Jan. 22, 2007

(65) Prior Publication Data

US 2008/0178080 A1 Jul. 24, 2008

(51) Int. Cl.
*G06F 3/00* (2006.01)

(52) U.S. Cl. .................. 715/700; 715/764; 715/771; 345/173; 711/114

(58) Field of Classification Search .............. 715/700, 715/764, 765, 771, 772, 810, 835, 846, 864, 715/966; 345/156, 173; 711/112, 113, 114; 714/42, 44

See application file for complete search history.

(56) References Cited

U.S. PATENT DOCUMENTS

| | | | | |
|---|---|---|---|---|
| 5,737,189 A * | 4/1998 | Kammersgard et al. | ..... | 361/726 |
| 5,748,744 A | 5/1998 | Levy et al. | ..... | 380/52 |
| 5,757,919 A | 5/1998 | Hebert et al. | ..... | 380/25 |
| 5,893,053 A * | 4/1999 | Trueblood | ..... | 702/187 |
| 5,930,358 A | 7/1999 | Rao | ..... | 380/4 |
| 5,956,633 A | 9/1999 | Janhila | ..... | 455/410 |
| 6,098,128 A * | 8/2000 | Velez-McCaskey et al. | ... | 710/65 |
| 6,172,948 B1 * | 1/2001 | Keller et al. | ..... | 369/83 |
| 6,337,918 B1 * | 1/2002 | Holehan | ..... | 382/124 |
| 6,868,160 B1 | 3/2005 | Raji | ..... | 380/30 |
| 6,871,063 B1 | 3/2005 | Schiffer | ..... | 455/410 |
| 6,871,278 B1 | 3/2005 | Sciupac | ..... | 713/185 |
| 6,917,490 B2 | 7/2005 | Pratt et al. | ..... | 360/78.08 |
| 6,957,330 B1 | 10/2005 | Hughes | ..... | 713/163 |
| 6,971,016 B1 | 11/2005 | Barnett | ..... | 713/182 |
| 6,973,187 B2 | 12/2005 | Gligor et al. | ..... | 380/28 |
| 6,980,659 B1 | 12/2005 | Elliott | ..... | 380/277 |
| 7,043,641 B1 | 5/2006 | Martinek et al. | ..... | 713/187 |
| 7,054,845 B2 | 5/2006 | Oshima et al. | ..... | 705/78 |
| 7,058,969 B2 | 6/2006 | Sambati | ..... | 726/2 |

(Continued)

*Primary Examiner*—X. L Bautista
(74) *Attorney, Agent, or Firm*—Hamilton & Terrile, LLP; Gary W. Hamilton

(57) ABSTRACT

A system and method is disclosed for visually communicating disk storage meta information comprising a removable data storage device (RDSD). An RDSD enclosure comprising a disk storage drive, input/output interface, one or more connectors, a storage information module (SIM), a power storage device, and a display is implemented to be connected, disconnected and reconnected to a plurality of predetermined information handling systems. The RDSD is connected to a predetermined information handling system and the SIM gathers information from a plurality of disk information files comprising the RDSD. Once gathered, this information is visually communicated via the SIM to a display comprising the RDSD. When connected to, and powered by, an information handling system, the displayed information is dynamically updated as the operational status of the RDSD changes, but becomes static when RDSD is disconnected. Mechanical switches or a touch sensitive screen are implemented to navigate static and dynamic disk information displayed on the RDSD display. Disk information that was current when the RDSD was last connected to an information handling system is persistently displayed on a display powered by battery.

18 Claims, 4 Drawing Sheets

U.S. PATENT DOCUMENTS

| | | | |
|---|---|---|---|
| 7,069,447 B1 | 6/2006 | Corder | 713/189 |
| 7,114,082 B2 | 9/2006 | Klein | 713/193 |
| 7,130,426 B1 | 10/2006 | Cha et al. | 380/201 |
| 7,140,044 B2 | 11/2006 | Redlich et al. | 726/27 |
| 7,146,495 B2 | 12/2006 | Baldwin et al. | 713/100 |
| 7,146,644 B2 | 12/2006 | Redlich et al. | 726/27 |
| 7,149,901 B2 | 12/2006 | Herbert et al. | 713/190 |
| 7,152,165 B1 | 12/2006 | Maheshwari et al. | 713/193 |
| 7,152,693 B2 | 12/2006 | Man et al. | 173/183 |
| 7,159,776 B2 | 1/2007 | Pratt | 235/454 |
| 7,162,647 B2 | 1/2007 | Osaki | 713/193 |
| 7,535,861 B2 * | 5/2009 | Buchholz et al. | 370/310 |
| 2002/0054750 A1 * | 5/2002 | Ficco et al. | 386/46 |
| 2002/0157010 A1 | 10/2002 | Dayan et al. | 713/191 |
| 2004/0039969 A1 | 2/2004 | Pratt et al. | 714/42 |
| 2004/0061970 A1 | 4/2004 | Pratt et al. | 360/78.08 |
| 2006/0026417 A1 | 2/2006 | Furusawa et al. | 713/2 |
| 2006/0034581 A1 | 2/2006 | Konetski et al. | 386/46 |
| 2006/0095647 A1 * | 5/2006 | Battaglia et al. | 711/100 |
| 2006/0288185 A1 | 12/2006 | Brisse et al. | 711/170 |
| 2008/0127354 A1 * | 5/2008 | Carpenter et al. | 726/28 |

\* cited by examiner

REMOVABLE HARD DISK WITH DISPLAY INFORMATION

BACKGROUND OF THE INVENTION

1. Field of the Invention

The present invention relates in general to the field of information handling systems and, more specifically, to displaying removable storage system information.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The diversity and amount of data managed by information handling systems continues to grow for consumer, corporate and government markets alike. This growth is driving the need for cost effective, scalable storage systems that can be quickly and easily configured for a wide variety of uses and applications. One approach to address these needs is the use of self-contained, transportable mass storage units that easily attach to a variety of systems. Another popular approach consists of mass storage devices that are mounted in standardized, interchangeable modules that can be transferred between systems. These interchangeable mass storage units are commonly used in the implementation of redundant array of independent disks (RAID) subsystems, which are already popular in corporate and government environments and are now gaining consumer acceptance as well.

RAID subsystems can share or replicate data across multiple disk drives, any of which can typically be removed and replaced ("hot swapped") while the system is running. While a RAID controller can check a disk's information to determine its identity and assignment to a particular array or group, this information is not directly visible to a user from the drive itself. Furthermore, a user is unable to visually verify a drive's contents, available capacity or whether the data it contains is authorized for use by a predetermined system. Instead, users have generally resorted to physical labels attached to the disk drive's body or enclosure to track the drive's identity, assignment, contents and available capacity. These labels are typically handwritten or printed by the system they are either currently or previously attached to. In some approaches, labels include bar codes to facilitate cataloging, tracking, retrieving and auditing a disk drive's usage and provenance. Regardless of their implementation, the user either has to trust that the information on the label is current and accurate, or else attach the removable disk to a system for verification. As a result, these uncertainties introduce potential errors and inefficiency into the use of removable drives, especially as the number of drives in use increases. Accordingly, removable and portable storage systems also need to provide a persistent, accurate, and up-to-date visual display of their identity and contents.

SUMMARY OF THE INVENTION

In accordance with the present invention, a system and method is disclosed for visually communicating mass storage meta information comprising a removable data storage device (RDSD). In various embodiments of the invention, an RDSD is contained in an enclosure comprising a disk storage drive, a display, a storage information module (SIM), and a power storage device. The enclosure also includes one or more interfaces and one or more connectors that allow the RDSD to be connected to an information handling system. In these embodiments, the SIM gathers information from a plurality of disk information files comprising the RDSD. For example, this information can include the total capacity of the RDSD, its available current capacity, its disk volume name, its Redundant Array of Independent Disks (RAID) array and group assignment, and the timestamp of its most recent update. Once gathered, this device status information is communicated via the SIM to a display controller, which generates display control signals to visually present the information on a display comprising the RDSD.

In one embodiment of the invention, the device status information is static and only displayed when the RDSD is attached to, and powered by, an information handling system. In another embodiment, the displayed device status information is dynamically updated as the operational status of the RDSD changes, but becomes static when the RDSD is disconnected from the information handling system. In another embodiment, device status information that was current when the RDSD was last connected to an information handling system is persistently displayed on a static information screen powered by battery.

In an embodiment of the invention, the device status information displayed on the RDSD display is navigable by the user using mechanical switches. In another embodiment, the device status information displayed on the RDSD display is navigable by the user using a touch-sensitive screen. In another embodiment, the most current dynamic device status information displayed by the RDSD display is navigable when connected to, and powered by, an information handling system. In another embodiment, the RDSD display is powered by a battery, and the most current static information is navigable when the RDSD is disconnected from an information handling system. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for visually communicating disk storage meta information comprising a removable data storage device (RDSD). In selected embodiments of the invention, an RDSD enclosure comprising a disk storage drive, input/output interface, one or more connectors, a storage information module (SIM), a power storage device, and a display is implemented to be connected, disconnected and reconnected to a plurality of predetermined information handling systems.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
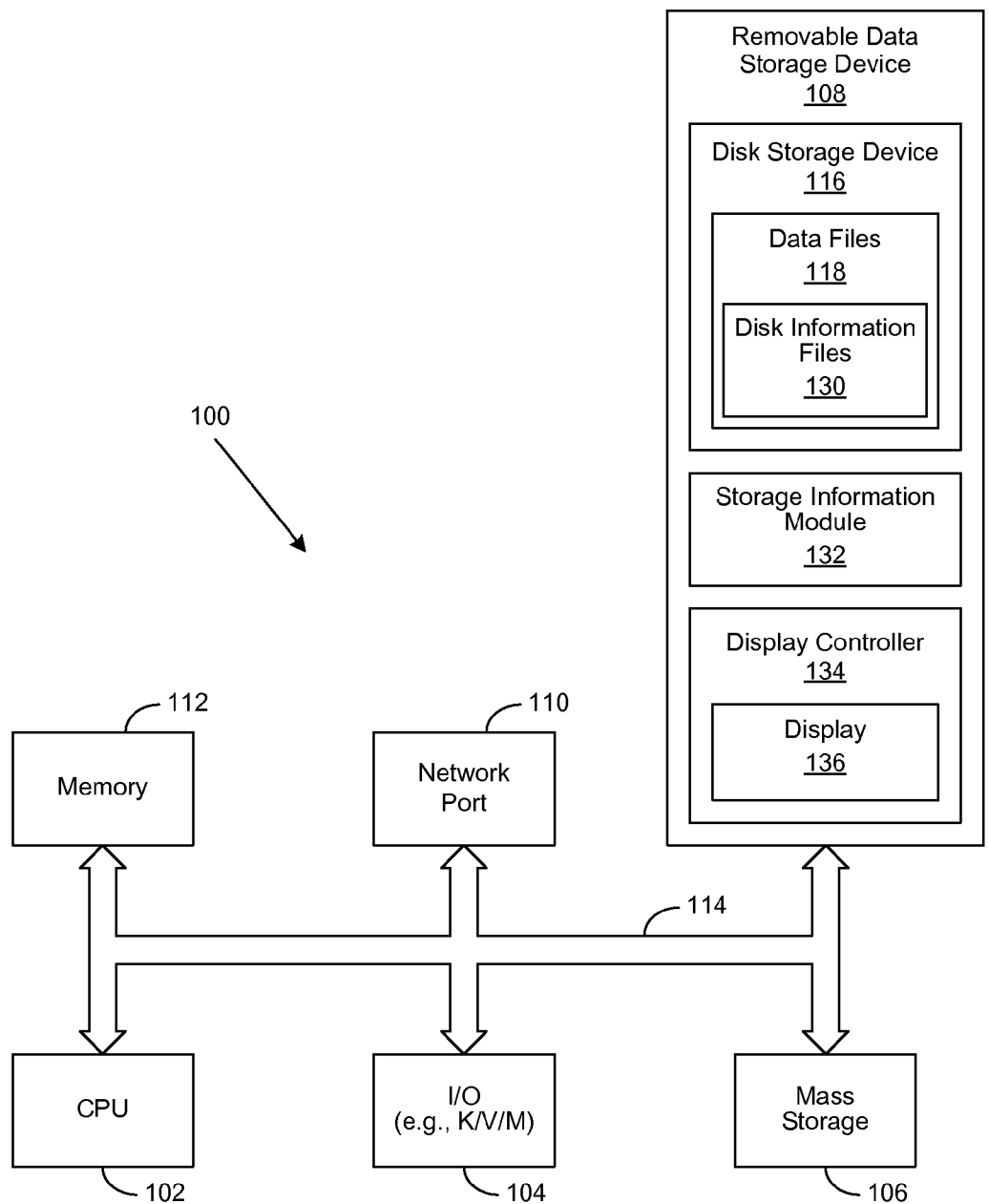
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, mass storage 106, various other subsystems, such as removable data storage device 108, network port 110 operable to connect to a network, and system memory 112, all interconnected via one or more buses 114. Removable data storage device 108 further comprises disk storage device 116, storage information module (SIM) 132, and display controller 134, which further comprises display 136. Disk storage device 116 comprises a plurality of data files 118, which further comprise disk information files 130.

Figure 2:
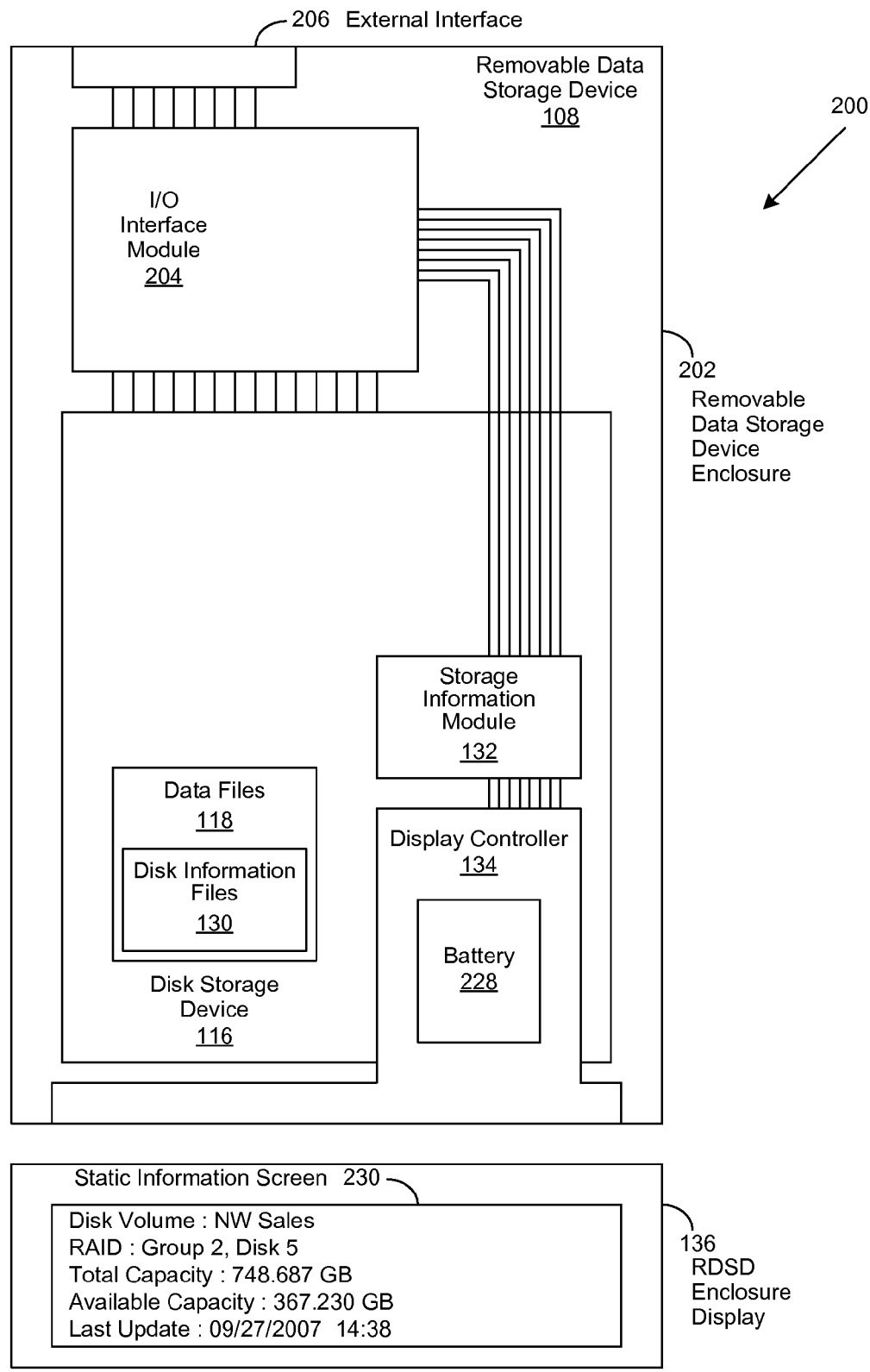
FIG. 2 is a generalized block diagram illustrating a removable data storage device (RDSD) static information display system as implemented in accordance with an embodiment of the invention.

FIG. 2 is a generalized block diagram illustrating a removable data storage device (RDSD) static information display system 200 as implemented with in accordance with an embodiment of the invention. In this embodiment, RDSD 108 comprises disk storage device 116, RDSD enclosure 202, input/output (I/O) interface module 204, external interface 206, storage information module (SIM) 132, and display controller 134, which further comprises battery 228. SIM 132 is coupled to input/output (I/O) interface module 204 and RDSD enclosure display 136, which comprises static information display screen 230. Disk storage device further comprises a plurality of data files 118, further comprising a plurality of disk information files 130.

In an embodiment of the invention, the RDSD 108 is connected to an information handling system and the SIM 132 gathers information relating to RDSD 108 and its operation from a plurality of disk information files 130. For example, this information can include the total capacity of the RDSD 108, its currently available capacity, its disk volume name, its Redundant Array of Independent Disks (RAID) array and group assignment, and the timestamp of its most recent update. Once gathered, this device status information is communicated via SIM 132 to display controller 134, which generates display control signals to visually present the information on static information screen 230. In one embodiment of the invention, the information is static and only displayed when the RDSD 108 is attached to, and powered by, an information handling system. In another embodiment, the displayed information is dynamically updated as the operational status of RDSD 108 changes, but becomes static when RDSD 108 is disconnected from an information handling system. In yet another embodiment, disk information that was current when the RDSD 108 was last connected to an information handling system is persistently displayed for a predetermined period of time on static information screen 230, which is powered by battery 228.

In one embodiment, a switch (not shown) is implemented to disconnect the battery 228 from display information module 134. In this embodiment, battery power is conserved when the switch is placed in a disconnected state. When the switch is placed in a connected state, the disk information that was current when the RDSD 108 was last connected to an information handling system is displayed on static information screen 230. In another embodiment, the battery 228 is not implemented and the disk information that was current when the RDSD 108 was last connected to an information handling system is retained and displayed when the RDSD 108 is reconnected to an information handling system.

Figure 3:
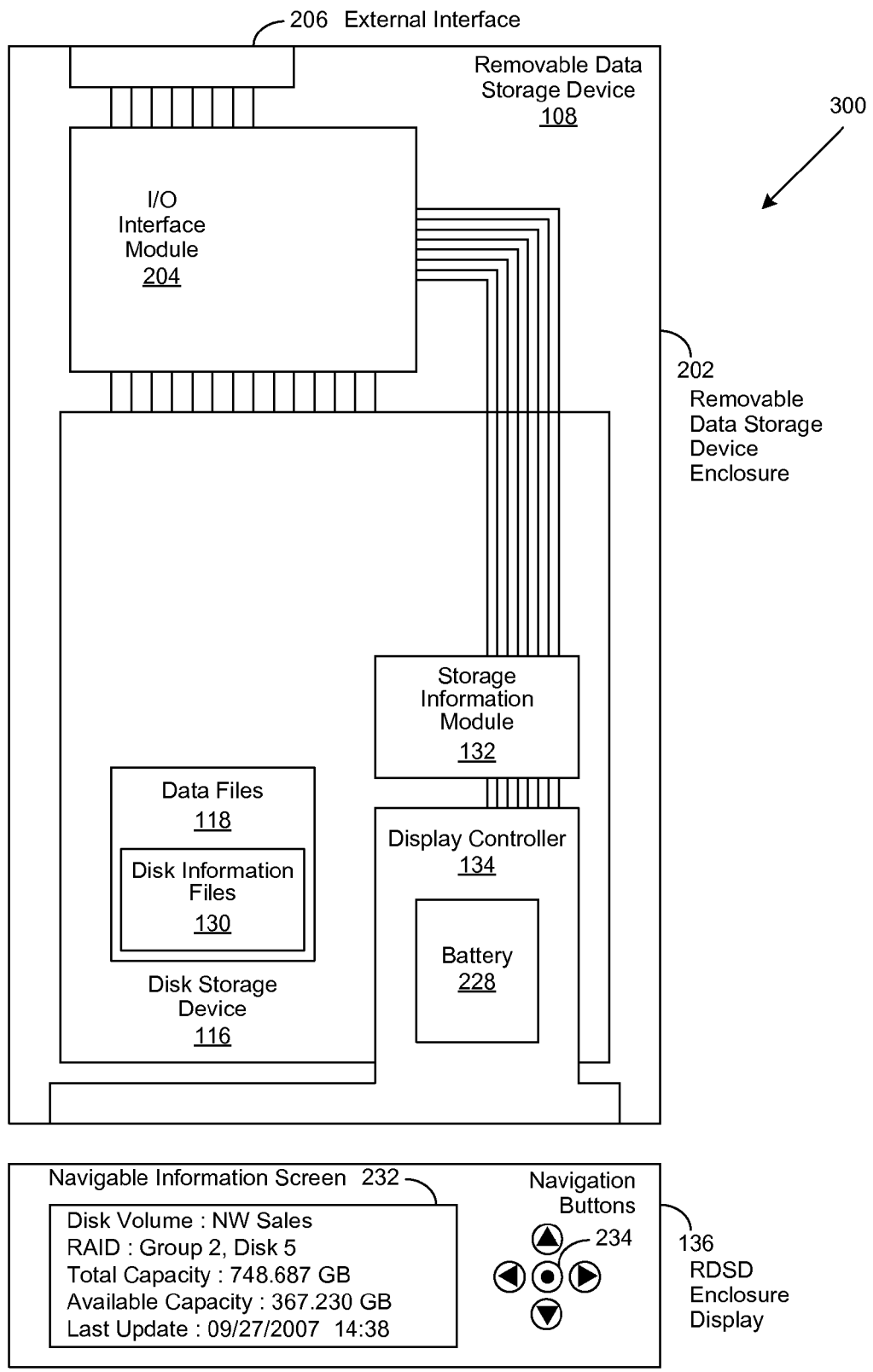
FIG. 3 is a generalized block diagram illustrating an RDSD navigable information display system as implemented with mechanical switches in accordance with an embodiment of the invention.

FIG. 3 is a generalized block diagram illustrating a removable data storage device (RDSD) navigable display system as implemented with mechanical switches 300 in accordance with an embodiment of the invention. In this embodiment, RDSD 108 comprises disk storage device 116, RDSD enclosure 202, input/output (I/O) interface module 204, external interface 206, storage information module (SIM) 132, and display controller 134, which further comprises battery 228. SIM 132 is coupled to input/output (I/O) interface module 204 and RDSD enclosure display 136, which comprises navigable information display screen 232 and mechanical navigation switches 234. Disk storage device further comprises a plurality of data files 118, further comprising a plurality of disk information files 130.

In an embodiment of the invention, the RDSD 108 is connected to an information handling system and the SIM 132 gathers information relating to RDSD 108 and its operation from a plurality of disk information files 130. For example, this information can include the total capacity of the RDSD 108, its currently available current capacity, its disk volume name, its Redundant Array of Independent Disks (RAID) array and group assignment, and the timestamp of its most recent update. Once gathered, this device status information is communicated via SIM 132 to display controller 134, which generates display control signals to visually present the information on navigable information screen 232. In one embodiment of the invention, the navigable disk information is only displayed when the RDSD 108 is attached to, and powered by, an information handling system. In this embodiment, the user can navigate a plurality of disk information displayed on navigable information screen 232 by pressing the appropriate navigation buttons 234. In another embodiment, the displayed information is dynamically updated as the operational status of RDSD 108 changes, but becomes static when RDSD 108 is disconnected from an information handling system. In another embodiment, disk information that was current when the RDSD 108 was last connected to an information handling system is persistently displayed on navigable information screen 232, which is powered by battery 228. In this embodiment, the most current disk information displayed on navigable information screen 232 can be navigated by the user when RDSD 108 is not attached to an information handling system.

In one embodiment, a switch (not shown) is implemented to disconnect the battery 228 from display information module 134. In this embodiment, battery power is conserved when the switch is placed in a disconnected state. When the switch is placed in a connected state, the disk information that was current when the RDSD 108 was last connected to an information handling system is displayed on navigable information screen 232 and is navigated using navigation buttons 234. In another embodiment, the battery 228 is not implemented and the disk information that was current when the RDSD 108 was last connected to an information handling system is retained and displayed when the RDSD 108 is reconnected to an information handling system.

Figure 4:
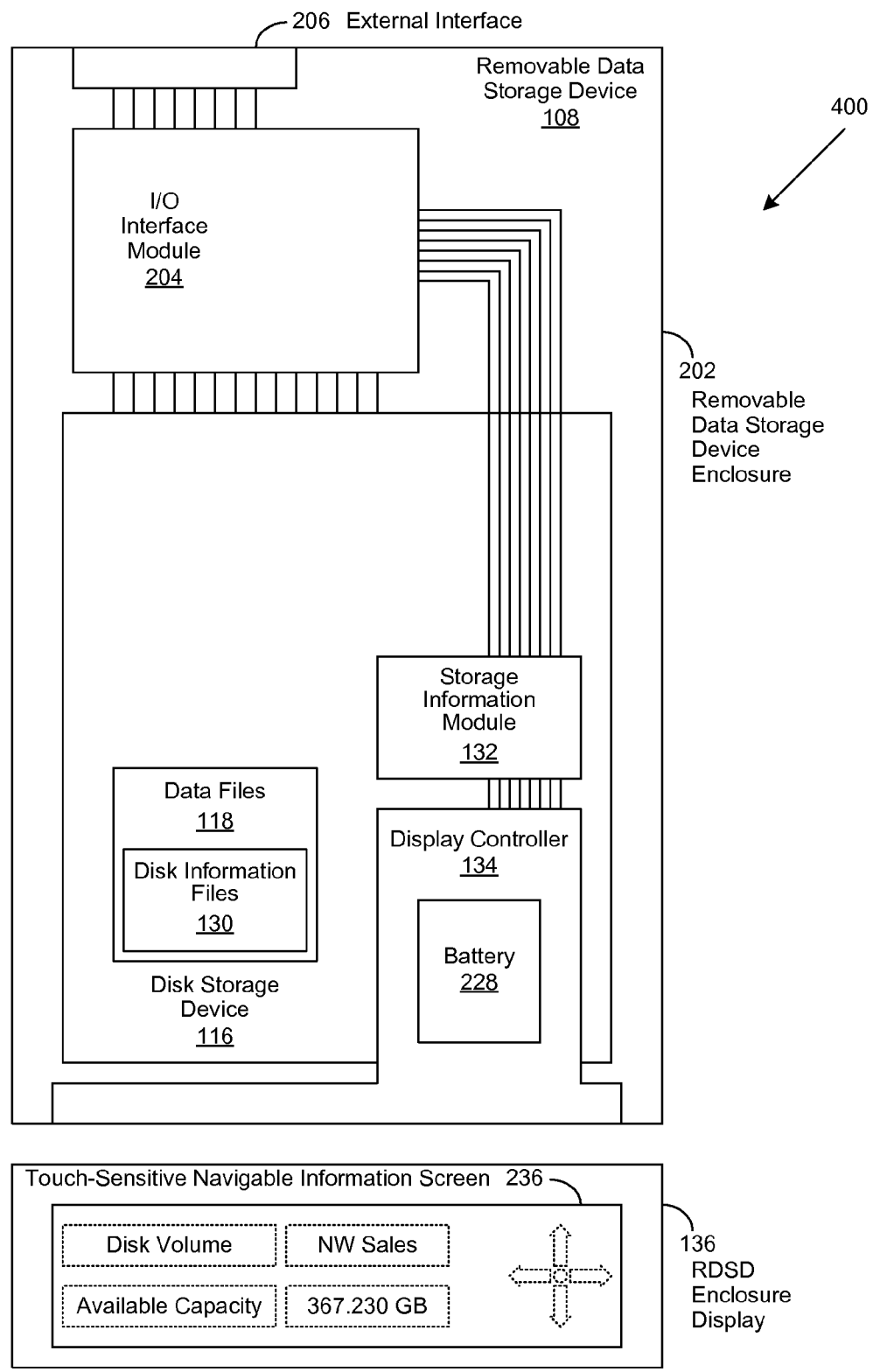
FIG. 4 is a generalized block diagram illustrating an RDSD navigable information display system as implemented with a touch-sensitive display screen in accordance with an embodiment of the invention.

FIG. 4 is a generalized block diagram illustrating a removable data storage device (RDSD) navigable display system as implemented with a touch-sensitive navigable display screen 400 in accordance with an embodiment of the invention. In this embodiment, RDSD 108 comprises disk storage device 116, RDSD enclosure 202, input/output (I/O) interface module 204, external interface 206, storage information module (SIM) 132, and display controller 134, which further comprises battery 228. SIM 132 is coupled to input/output (I/O) interface module 204 and RDSD enclosure display 136, which comprises touch-sensitive navigable information display screen 236. Disk storage device further comprises a plurality of data files 118, further comprising a plurality of disk information files 130.

In an embodiment of the invention, the RDSD 108 is connected to an information handling system and the SIM 132 gathers information relating to RDSD 108 and its operation from a plurality of disk information files 130. For example, this information can include the total capacity of the RDSD 108, its currently available current capacity, its disk volume name, its Redundant Array of Independent Disks (RAID) array and group assignment, and the timestamp of its most recent update. Once gathered, this device status information is communicated via SIM 132 to display controller 134, which generates display control signals to visually present the information on touch-sensitive navigable information screen 236. In one embodiment of the invention, the navigable disk information is only displayed when the RDSD 108 is attached to, and powered by, an information handling system. In this embodiment, the user can navigate a plurality of disk information displayed on navigable information screen 232 by pressing the appropriate screen navigation icons. In another embodiment, the displayed information is dynamically updated as the operational status of RDSD 108 changes, but becomes static when RDSD 108 is disconnected from an information handling system. In another embodiment, disk information that was current when the RDSD 108 was last connected to an information handling system is persistently displayed on touch-sensitive navigable information display screen 232, which is powered by battery 228. In this embodiment, the most current disk information displayed on touch-sensitive navigable information display screen 232 can be navigated by the user when RDSD 108 is not attached to an information handling system.

In one embodiment, a switch (not shown) is implemented to disconnect the battery 228 from display information module 134. In this embodiment, battery power is conserved when the switch is placed in a disconnected state. When the switch is placed in a connected state, the disk information that was current when the RDSD 108 was last connected to an information handling system is displayed and navigated using touch-sensitive navigable information screen 236. In another embodiment, the battery 228 is not implemented and the disk information that was current when the RDSD 108 was last connected to an information handling system is retained and displayed when the RDSD 108 is reconnected to an information handling system.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A display system for a removable data storage device (RDSD), comprising:
   a storage medium having a plurality of device status files stored thereon;
   a storage information module (SIM) operable to access said device status files and to generate predetermined device status signals therefrom;
   a display controller operable to receive said device status signals and to generate display control signals therefrom; and
   a display operable to use said display control signals to display information corresponding to predetermined status parameters of said storage medium;
   wherein said RDSD is operable to be used in a redundant array of independent disks (RAID) system coupled to an information handling system and said storage medium, said SIM, said display controller, and said display are contained in a removable housing comprising an input/output interface operable to control the transfer of data between said RAID system, said storage medium and said information handling system.

2. The system of claim 1, wherein said displayed information comprises static information corresponding to predetermined status parameters of said storage medium.

3. The system of claim 1, wherein said displayed information comprises dynamic information corresponding to predetermined status parameters of said storage medium.

4. The system of claim 1, wherein said display is powered by said information handling system and is operable to communicate said predetermined information when connected to said information handling system.

5. The system of claim 1, wherein said display is powered by a battery and is operable to persistently communicate said predetermined information when disconnected from said information handling system.

6. The system of claim 5, wherein said persistently communicated information comprises the current status of said predetermined information when said storage device was last powered by said information handling system.

7. The system of claim 1, wherein said display controller and said display are operable to modify the displayed information in response to user input data.

8. The system of claim 7, wherein said display comprises mechanical contact switches operable to receive said user input data.

9. The system of claim 7, wherein said display comprises a touch-sensitive screen operable to receive said user input.

10. A method of displaying information regarding the status of a removable data storage device (RDSD), comprising:
   storing a plurality of device status files on a storage medium;
   using a storage information module (SIM) to access said device status files and to generate predetermined device status signals therefrom;
   using said device status signals to generate display control signals; and
   using said display control signals to display information corresponding to predetermined status parameters of said storage medium;
   wherein said RDSD is operable to be used in a redundant array of independent disks (RAID) system coupled to an information handling system and said storage medium, said SIM, said display controller, and said display are contained in a removable housing comprising an input/output interface operable to control the transfer of data between said RAID system, said storage medium and said information handling system.

11. The method of claim 10, wherein said displayed information comprises static information corresponding to predetermined status parameters of said storage medium.

12. The method of claim 10, wherein said displayed information comprises dynamic information corresponding to predetermined status parameters of said storage medium.

13. The method of claim 10, wherein said display is powered by said information handling system and is operable to communicate said predetermined information when connected to said information handling system.

14. The method of claim 10, wherein said display is powered by a battery and is operable to persistently communicate said predetermined information when disconnected from said information handling system.

15. The method of claim 14, wherein said persistently communicated information comprises the current status of said predetermined information when said storage device was last powered by said information handling system.

16. The method of claim 10, wherein said display controller and said display are operable to modify the displayed information in response to user input data.

17. The method of claim 16, wherein said display comprises mechanical contact switches operable to receive said user input data.

18. The method of claim 16, wherein said display comprises a touch-sensitive screen operable to receive said user input.

* * * * *